INVENTOR.
HAROLD F. ALLEN
BY Bodell & Thompson
ATTORNEYS

Patented Feb. 22, 1949

2,462,707

UNITED STATES PATENT OFFICE 2,462,707

SCRAP REMOVING DEVICE

Harold F. Allen, De Witt, N. Y., assignor to Allen Jigger Corporation, Syracuse, N. Y., a corporation of New York Application October 17, 1947, Serial No. 780,400

5 Claims. (Cl. 25—24)

This invention relates to a device for removing the scrap material during the jiggering of pottery ware. As is well understood, the jiggering operation is performed on what is known as a jigger, or jiggering machine. This machine consists, in general, of a vertically journalled spindle, on the upper end of which is placed a plaster mould having plastic clay, or ceramic material thereon. An arm is pivotally mounted on the machine and carries at its outer end a jiggering, or forming tool. When the arm is moved about its axis, the tool is lowered into engagement with the plastic material and forms the same during rotation of the spindle into the desired form, the surface of the mould forming one side of the piece of ware and the tool shaping the opposite side.

It is not practical, or possible, to accurately measure the quantity of plastic material needed to form a particular piece of ware. The material placed upon the mould is always in excess of that needed to form the piece of ware, with the result that there is no excess, or waste, or scrap material at the end of the forming operation.

This invention has as an object a scrapping device of exceptionally simple construction mounted in a predetermined relation to the forming tool, and which serves to trim both the peripheral edge of the piece of formed ware and remove any excess material from the top surface of the marginal portion of the mould.

The invention consists in the novel features and in the combinations and constructions hereinafter set forth and claimed.

In describing this invention, reference is had to the accompanying drawings in which like characters designate corresponding parts in all the views.

Figures 1, 2:
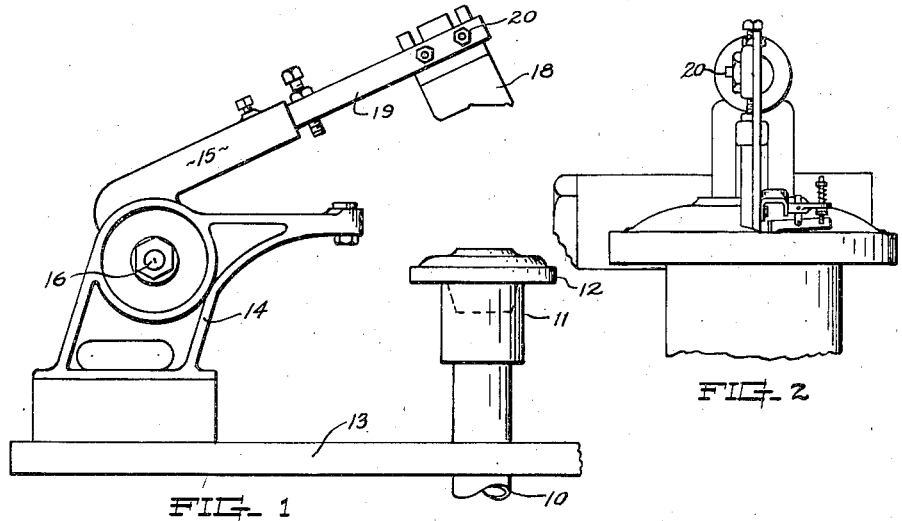
Figure 1 is a side elevational view of a jiggering machine on which the scrapping device is used.
Figure 2 is a front elevational view of the machine shown in Figure 1 and including the scrapping device.

In the drawings, 10 designates a spindle journalled in a suitable frame, not shown, and provided at its upper end with a mould receiving pocket 11 to receive a mould 12. The spindle 10 extends upwardly through a top plate 13 of the machine frame and on which is mounted a supporting bracket 14. A tool carrying member 15 is pivotally mounted on the bracket by means of a pin 16. The forming tool 18 is adjustably mounted on an arm 19 by bolts 20. The lower end of the tool 18 is formed with a contour comparable to the bottom side of the piece of ware. It will be understood that the top surface of the mould 12 is formed to produce the finish on the upper side of the piece of ware.

The scrapping device 22 consists of an angular blade having a horizontal edge 23 and a vertically extending edge 24. This blade is mounted in predetermined relation to the tool 18. As here shown, the blade is carried by a bracket consisting of a U-shaped member 25 provided in one leg with an elongated aperture 26 to receive a cap screw 27 threading into the tool 18 and by which it is adjustably secured thereto. The opposite leg portion 28 is apertured to receive a screw 29 which serves to secure a support member 30 to the U member 25. The member 30 is provided with a depending pin 31 bifurcated at its lower end and to which the vertical side of the blade is pivotally mounted by a pin 32. The pin 31 is adjustable vertically in the member 30 by set screws 33. With this arrangement, the scrapping device may be adjusted vertically toward and from the mould and radially toward and from the center of the mould.

Figures 3, 4:
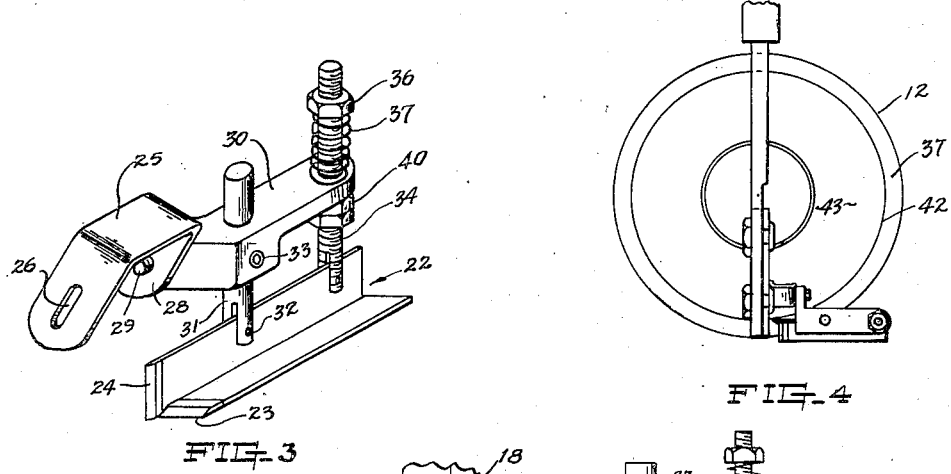
Figure 3 is a perspective view of the scrapping device.
Figure 4 is a top plan view of the forming tool and scrapping device positioned over the mould.
Figure 5:
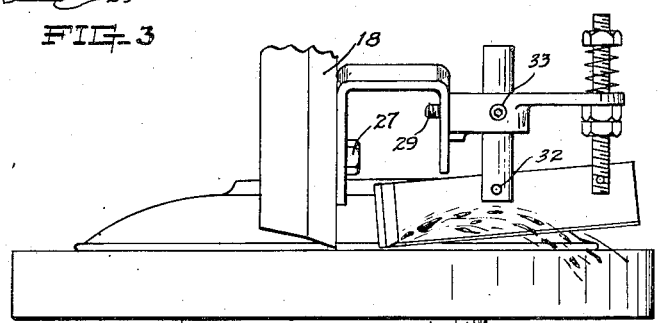
Figure 5 is an enlarged front elevational view of the scrapping device and contiguous portion of the forming tool.

A rod 34 is pivotally secured at its lower end to the rear portion of the blade, the rod extending freely through an aperture in the support member 30, and being provided at its upper end with an adjustable nut 36. A helical compression spring 37 is interposed between the support member 30 and the nut 36 yieldingly urging the rear portion of the blade upwardly and the edge 23 into engagement with the marginal portion 37 of the mould. The extent of this movement is controlled by lock nuts 40 threaded on the rod 34 and engaging the under side of the support 30, see Figures 3 and 5.

The scrapping device is adjusted so that the vertical edge 24 will trim the peripheral edge 42 of the piece of ware 43. An important feature of this device is that the vertical trimming edge 24 extends forwardly of the horizontal edge 23, see Figures 3 and 5.

With this arrangement, the excess plastic material is trimmed from the peripheral edge of the ware in advance of the removal of the excess material from the marginal portion 37 of the mould. The plastic material on the marginal surface of the mould is retained thereon with considerable retention. Heretofore, it was endeavored to separate this material simultaneously from the mould and from the piece of ware, with the result that some of the material would be torn from the piece of ware and thus make it defective.

With my device, I trim the ware in advance and thereafter remove the excess material from the marginal portion of the mould by the horizontal blade 23. With this construction, the scrapping device operates satisfactorily on both an automatic jiggering machine and a hand operated machine, effectively removing the scrap material without in any way damaging the ware being jiggered.

What I claim is:

1. A scrap removing device for pottery jiggering machines comprising a blade member formed with a horizontal mould trimming edge and a vertical ware trimming edge, said latter edge extending forwardly of the horizontal edge, and means for mounting said blade in predetermined relation to the jiggering tool.

2. A scrap removing device for pottery jiggering machines comprising a blade member formed with a horizontal mould trimming edge and a vertical ware trimming edge, said latter edge extending forwardly of the horizontal edge, means for mounting said blade in predetermined relation to the jiggering tool, and means yieldingly urging said horizontal edge against the marginal surface of the mould during the jiggering operation.

3. A scrap removing device for pottery jiggering machines comprising a trimming blade formed with a horizontal mould trimming edge and a vertical ware trimming edge, said latter edge extending forwardly of the horizontal edge, said blade being pivotally mounted on a bracket adjustably secured to the forming tool, and means yieldingly urging said blade about its pivot to position said horizontal edge against the marginal surface of the mould during the jiggering operation.

4. A scrap removing device for pottery jiggering machines comprising a support, a scrap removing blade mounted on said support, said blade being formed at its forward end with an edge portion arranged in trimming position to the periphery of a piece of ware on a mould, and said blade being also formed with a horizontal edge portion arranged to engage the top marginal surface of the mould, means cooperable to yieldingly move said horizontal edge into engagement with the surface of the mould, and means for detachably securing the support to the forming tool and being operable to adjust the blade toward and from the surface of the mould and radially of the axis thereof.

5. A scrapper for pottery jiggering machines comprising a bracket adjustably secured to the jiggering tool, a support adjustably secured to the bracket, a scrap removing blade pivotally mounted intermediate its ends to said bracket, said blade being formed with a horizontal edge at its forward end arranged to engage the top surface of a mould, and having a vertical edge portion arranged in trimming relation to the periphery of a piece of ware on the mould, said vertical edge extending forwardly of said horizontal edge, and means cooperable to yieldingly urge said horizontal edge against the surface of the mould.

HAROLD F. ALLEN.

No references cited.